Aug. 27, 1940. M. E. McGOWAN 2,212,842
MACHINE FOR SEALING-IN AND MOLDING LAMP BULBS
Filed Dec. 21, 1935 4 Sheets-Sheet 1
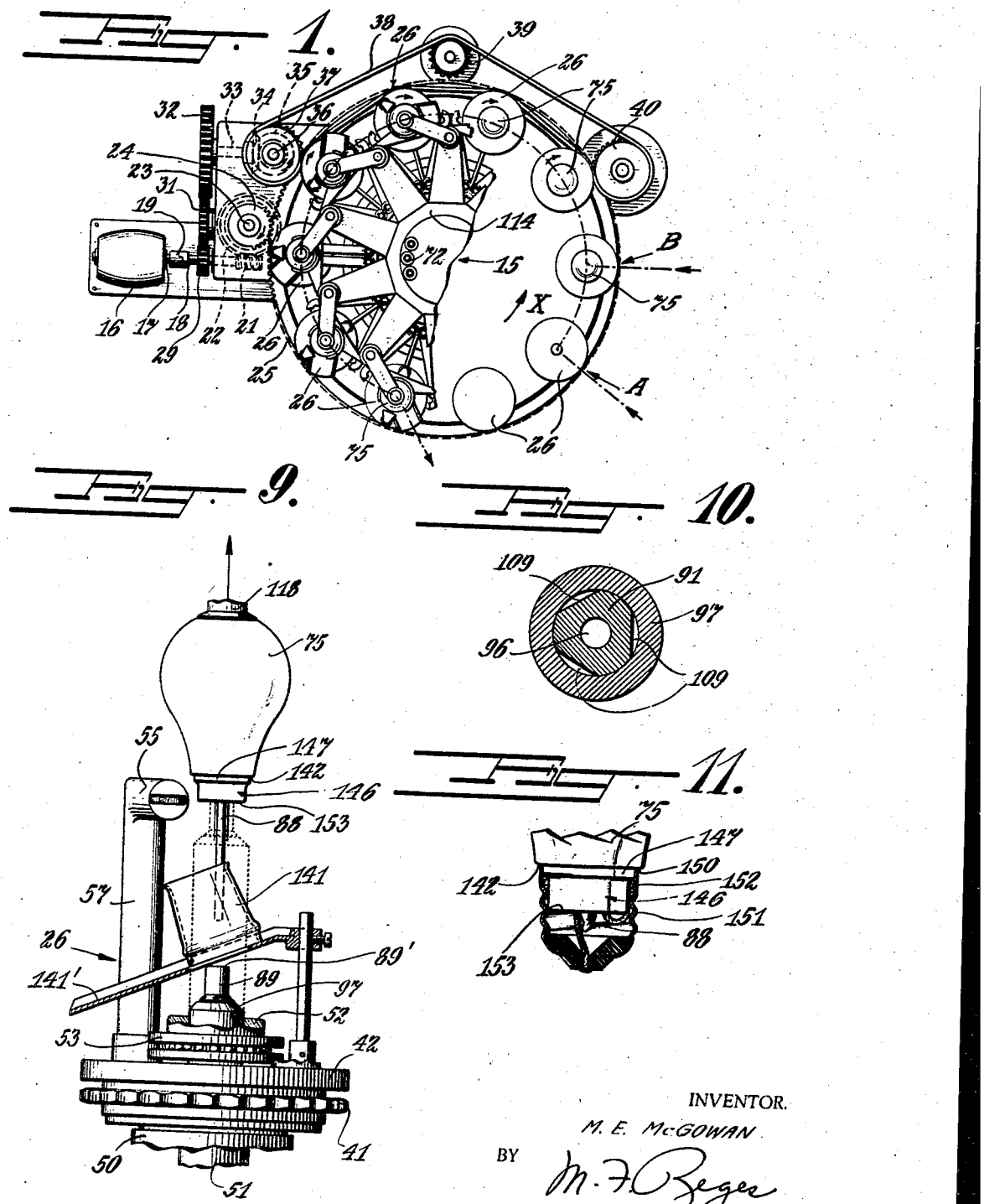
INVENTOR.
M. E. McGOWAN
BY
ATTORNEY.

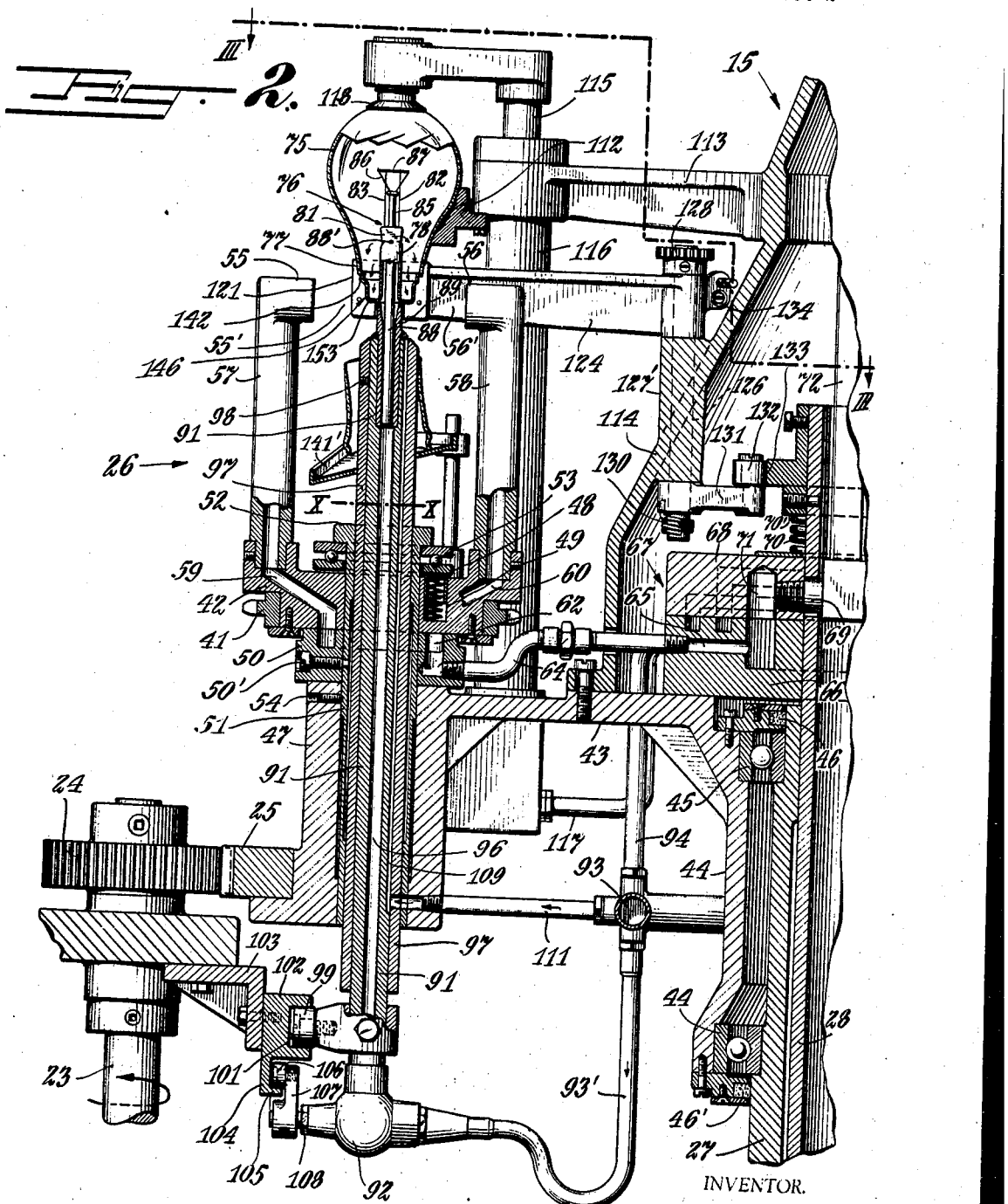

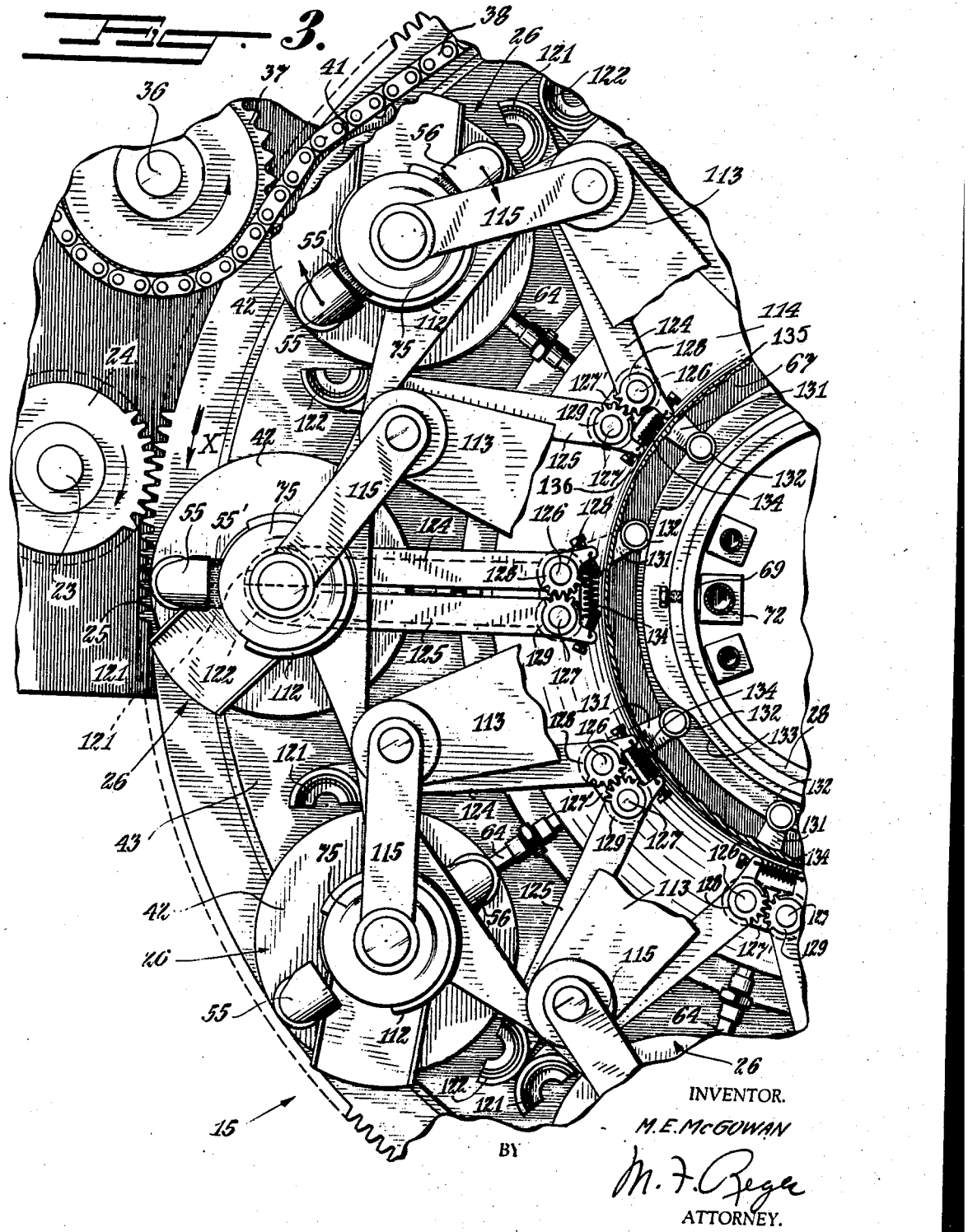

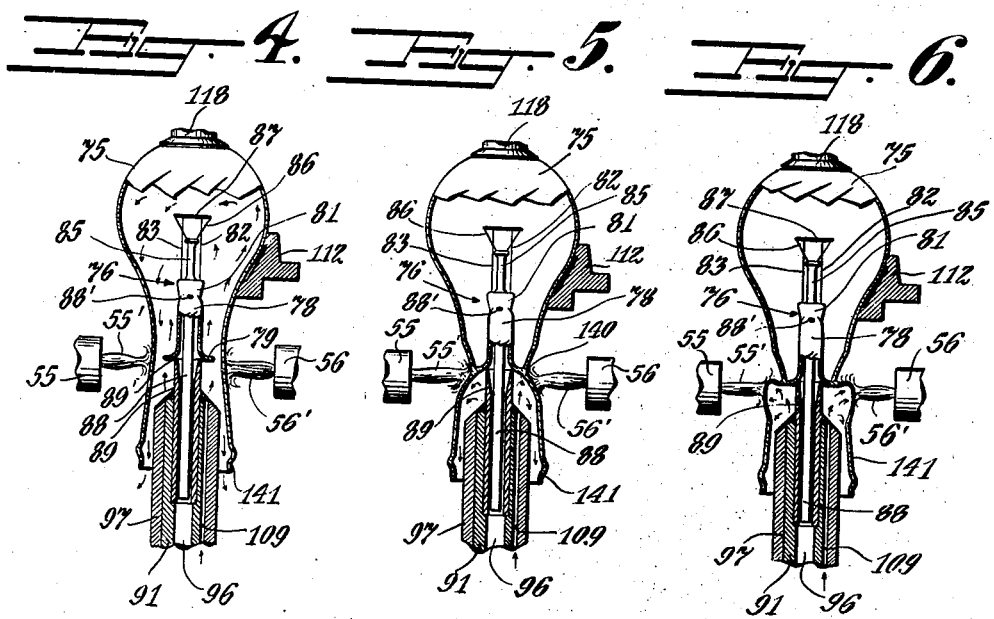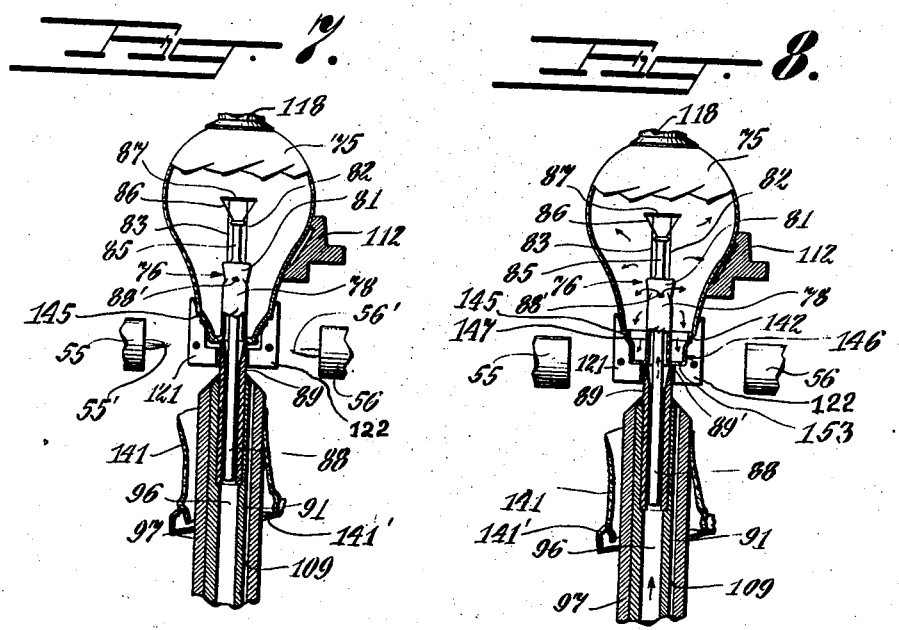

Patented Aug. 27, 1940

2,212,842

UNITED STATES PATENT OFFICE 2,212,842

MACHINE FOR SEALING-IN AND MOLDING LAMP BULBS

Michael E. McGowan, Bloomfield, N. J., assignor, by mesne assignments, to Westinghouse Electric and Manufacturing Company, East Pittsburgh, Pa., a corporation of Pennsylvania Application December 21, 1935, Serial No. 55,519

14 Claims. (Cl. 49—2)

This invention relates to the manufacture of incandescent electric lamps and similar devices, and more particularly to apparatus for sealing together two glass parts of said devices and for shaping the seals, also for shaping the bulb neck to form an annular abutment to seat the edge of a lamp base.

The manufacture of devices of the above character, such as incandescent electric lamps, includes the operation of uniting what is termed a stem or mount, including a glass flare tube, to the neck portion of a bulb. In addition to the sealing operation it is desirable to shape the united parts while still plastic so that when completing the lamp another part termed the base may more readily be applied and held in fixed relation to the bulb.

Machines for performing a sealing-in operation have long been used in the lamp making industry and it has been the practice to first prepare the assembled parts by slowly heating to a conditioning temperature. This preliminary heating was considered necessary before subjecting the parts to the hot sealing fires. The preheating step retarded the speed of manufacture, particularly in connection with machines which operated continuously to give the maximum speed in production.

Developments in the lamp industry, especially those relating to high-speed production, include machines which will function to perform the required operations without the necessity of stopping for time-consuming operations. In machines as heretofore employed the conveyor which carried the lamp parts was indexed to provide a given number of stationary periods and obviously the rate of production was determined and dependent on the time required to perform the longest operation.

In my copending application Serial No. 37,111 filed August 21, 1935, now Patent No. 2,132,538, dated Oct. 11, 1938, and owned by the assignee of the present application, a machine is shown for performing the operation of sealing the bulb after exhaust. Obviously such a machine, which operates continuously at relatively high speed, would lose a great deal of its value if the preceding operation of sealing-in failed to perform with the necessary rapidity.

As above mentioned, it was believed that bulbs required preheating before being passed to the sealing fires; whereas, in accordance with the present invention, no preheating is employed but the lamp parts, while cold or at room temperature, are inserted into the high temperature sealing fires. This is possible by reason of the present method of circulating air or other gas into the bulb during the sealing operation. The air which passes the bulb surface directly in contact with the fires is slightly warmed and the bulb immediately absorbs some heat from the air. As the temperature of the bulb is raised, the ciculating air dissipates or carries away sufficient heat to prevent the formation of internal stresses in the glass which might result in cracks, as would ordinarily be expected when a cold glass body is subjected to a quick temperature change.

The present invention also includes the operation of forming or shaping the bulb neck to receive a base. The formation of the bulb neck is important and has been accomplished heretofore by molding members, such as shown in Patent No. 2,006,231 issued June 25, 1935. This patent shows a bulb neck formed to receive a base but, as will be noted, the contour of the bulb neck in cross section is made with rounded surfaces. This follows the practice of avoiding sharp corners although it is of great advantage to provide a straight or flat shoulder to hold a base, particularly when used with what is termed a mechanical base, where the base is held mechanically instead of by cement.

The present invention provides molding means which is formed so as to furnish the bulb neck with a sharp or substantially right angle shoulder or annulus, to provide a flat face or contact surface which cooperates with other mechanical means to hold a base against relative movement when attached to a bulb neck. Although a sharp-cornered shoulder is contrary to previous teachings and practice, bulbs shaped in accordance with the present method were subjected to the usual tests, including the storage of lamps over a period of months, for the determination of developed cracks. It was found that the present method gave a satisfactory and commercial lamp free from internal stress and an extremely low percentage of cracked or leaky lamps.

It is, therefore, an object of the present invention to provide a simple and effective machine for performing a high-speed sealing-in operation.

Another object of the invention is to provide a continuously operating sealing-in machine.

A further object of the invention is to provide a machine wherein a plurality of lamp parts, including a bulb, are directly positioned in a high temperature zone for a sealing-in operation without preheating.

A still further object of the invention is to provide a machine for fusing a plurality of glass lamp parts together, and shaping the fused portion during the movement of the parts on a conveyor.

Another object of the invention is to provide a machine for applying high temperature flames to unheated lamp parts, and in performing a sealing-in operation in the absence of detrimental strains or cracks.

A further object of the invention is to provide a lamp bulb having the neck portion thereof formed with a shoulder of substantially right angular form in transverse cross section, free from detrimental stresses or cracks.

Other objects and advantages of the invention will be more clearly understood from the following description, together with the accompanying drawings in which:

Fig. 1 is a plan view of a machine constructed in accordance with the present invention and showing a plurality of work holding heads on a conveyor;

Fig. 2 is an enlarged cross sctional view of one of the heads of the machine and includes part of the conveyor;

Fig. 3 is a view taken on line III—III in Fig. 2, looking in the direction of the arrows;

Figs. 4 to 8, inclusive, show a bulb and stem in the various stages during the sealing-in and molding operations;

Fig. 9 is a side elevational view of a bulb in a head after the sealing-in and shaping operations have been performed;

Fig. 10 is a sectional view taken on line X—X in Fig. 2 and

Fig. 11 is a fragmentary view of a bulb with a base applied thereto showing the relation between the edge of the base and the sharp shoulder on the bulb.

A machine constructed in accordance with the present invention comprises a conveyor 15 rotated continously at a given speed by means of a motor 16. The motor shaft 17 rotates a horizontal shaft 18 by means of a coupling 19. The said shaft 18 is provided with a worm 21 in mesh with a worm wheel 22 on a vertical shaft 23. This shaft is provided with a pinion 24 in mesh with a gear wheel 25 mounted on and constituting part of the conveyor 15. The conveyor is provided with a plurality of rotatable heads or holders 26 to be described later.

The conveyor is mounted for rotation on a stationary support or standard 27 extending upwardly from a base (not shown) and within the standard is a hollow post 28 which extends above the standard to support certain operating elements, to be described later. The conveyor carries the heads through a circular path and during a portion of their movement with the conveyor the heads are rotated relative to the conveyor. This rotation of the heads is accomplished by means of a pinion 29 on the horizontal shaft 18. The pinion 29 is in mesh with an idler gear 31 which in turn is in mesh with a spur gear 32 at one end of a shaft 33. The opposite end of the shaft 33 is provided with a bevel gear 34 in mesh with a bevel gear 35 at the lower end of a vertical shaft 36.

At the upper end of shaft 36 is a sprocket wheel 37 which serves as a driver for an endless link chain 38 which leads about sprockets 39 and 40. The sprockets are so arranged about the conveyor that the link chain engages sprocket wheels 41 (see Fig. 2) mounted on the hubs or manifolds 42 of the heads. The span of the link chain is so proportioned that the sprocket wheels of four heads are engaged at one time. Thus, four of the heads are continuously rotated as the conveyor moves and as one head becomes disengaged with the chain another head becomes engaged.

As more clearly shown in Fig. 2, the heads 26 are mounted on the rotatable carrier or conveyor 15 comprising a circular plate 43 having a hub 44 rotatably mounted on the standard 27 by means of roller bearings 44 and 45. Dust caps or seals 46 and 46' are provided at opposite ends of the hub. Around the perimeter of the plate 43 are provided a plurality of bearings 47 for the heads 26 disposed in spaced circular relation, and in the present construction ten such bearings are employed since ten heads are used, although the number of heads may be varied depending on the capacity of the machine.

The heads 26 are of similar construction and a description of one will answer for all. As shown in Fig. 2 each head is provided with a rotatable manifold 42 which in conjunction with bearing 47 holds a hollow shaft 51. Below the manifold 42, and constituting a part thereof, is a manifold extension 50 secured to shaft 51 by set screw 50'. The shaft 51 is provided with a bearing flange 52 and between the flange and the manifold is a roller bearing 53. The shaft 51 is secured to the bearing 47 by a set screw 54, and the manifold 42 is rotatable about the shaft 51.

Capped springs 48 disposed in sockets 49 press against the bearing 53 and hold the manifold extension 50 in sealed relation to the manifold 42. Extending upwardly from the manifold are positioned a plurality of burners 55 and 56 to project flames 55' and 56'. These burners are mounted on stand pipes 57 and 58 which communicate with passages 59 and 60 in the manifold 42. The passages communicate with a channel 62 in the manifold extension 50 which is stationary and is connected with a gas or other combustible fluid supply pipe 64. This pipe is connected to a passage 65 in the nether plate 66 of a main rotary valve 67.

A top plate 68 of the valve is provided with an inlet pipe 69 and a helical spring 70 held by a collar 70' holds the plates in the required tight relation for the flow of gas through channel 71. The inlet pipe 69 is connected to a feed pipe 72 which connects with a source of supply (not shown). The top plate 68, is secured to the standard 28 and the nether plate 66 is attached to and moves with the conveyor. As the conveyor rotates, the valve by reason of the channel 71 permits gas to flow to the burners. The valve 67 also operates to supply air to the head for other purposes to be presently explained.

In the present embodiment of the invention the burners 55 and 56 rotate about the work part to be heated although it is to be understood that if desirable a construction may be employed in which the work part may be rotated and the burners held stationary. The rotation of the present burners is effected by means of the chain 38 which engages sprocket wheel 41, as above pointed out.

The work parts to be fused and united include a bulb 75 and a stem or mount 76. The bulb is so formed as to have a neck portion 77 and the mount includes a glass flare tube 78 having a flared portion or flange 79. One end of the flare tube is provided with a compressed portion or press 81 in which lead wires 82 and 83 are sealed. Extending from the press is an arbor 85 having support wires 86 to hold a filament 87 and extending downwardly from the press is an exhaust tube 88 communicating with the bulb by an orifice 88'.

When sealing a lamp mount to a bulb the mount is held in vertical alignment with the longitudinal axis of the bulb by means of the exhaust tube which is inserted in a tubular receiver 89. This receiver is positioned in the upper end of a hollow shaft 91. The receiver is arranged to extend above the shaft 91 and has a tapered mouth to receive the exhaust tube which is inserted into the receiver and the flange of the flare tube seats on the upper end 89' of the receiver. The lower end of shaft 91 is connected, through valve 92, with a flexible pipe 93' which leads to a distributing conduit 93, connected with valve 67 by means of pipe 94.

The valve 67, as above pointed out, includes the plates 66 and 68 which, when moved relatively, open and close passages for the flow of air or gas. The mechanism of this valve is not shown or described in detail since such valves are well known in the art to which the present invention relates. The valve is connected by suitable means with a pressure air supply and vacuum line (not shown), with inlets in the upper plate 68 of the valve, so that as the conveyor rotates air may be admitted to pipe 93 and thence to passage 96 in the hollow shaft 91. This shaft is movable longitudinally with a sleeve 97 slidably fitted in the hollow shaft 51.

The shaft 91 and the sleeve 97 are secured in fixed relation by a set screw 98 and constitute a stem support member movable as a unit longitudinally of the shaft 51. The shaft 91 extends below the sleeve 97 and is provided with an extended roller 99 disposed in a cam track 101 of a cam 102, mounted on a stationary bracket 103 adjacent to the path of travel of the conveyor. The cam track is so formed that the roller 99 is raised and lowered to reciprocate the stem support member for reasons to be described later. The cam 102 has an extension 104 provided with a cam track 105 to receive a roller 106 at one end of an arm 107. The other end of the arm is fastened to a shaft 108 of the valve 92, so that upon a movement of the arm 107 the valve 92 will be operated to control the flow of air in passage 96.

In accordance with the present invention it is important, during the sealing operation, to provide a circulation of air in the bulb before and during the application of heat to the bulb neck. At the proper time, the valve 92 is opened and air flows into the bulb through passage 96, exhaust tube 88, and exhaust aperture or orifice 88'. During the sealing operation when the bulb neck has united with the flare tube and the glass is still plastic, the bulb wall is forced outwardly by air delivered through a passage 109 between shaft 91 and sleeve 97. This passage has its outlet at the top of the stem support but below the upper end 89' of the receiver 89. Air is supplied to passage 109 through pipe 111 which connects with the distributing conduit 93. A flow of air passing through the passage 109 circulates within and around the bulb which is held in a support 112 secured to a bracket arm 113 integral with a cover plate or casing 114 constituting part of the conveyor structure. The arm 113 also serves as a bearing guide for a plunger 115 movable in a cylinder or casing 116.

The lower end of the cylinder 116 is connected by pipe 117 to the main valve 67 which at the proper time connects with a vacuum line to exhaust the cylinder and cause the plunger 115 to descend. At the upper end of the plunger is a cap 118 which fits the upper spherical surface of the bulb and serves, when the plunger is in its lower position, to hold the bulb on its support during the sealing-in operation. When the bulb is to be removed the valve 67 admits air under pressure raising the plunger to lift the cap 118 clear of the bulb.

In accordance with the present invention the sealed portion of the bulb is shaped or molded to a definite form and for this purpose molding members 121 and 122 are provided. When the neck portion of seal is shaped by the molding members the shaped portion is so formed that the stem is positioned in predetermined space relation to the wall of the bulb and the filament is disposed in a given position relative to the shaped seal. The molds are mounted on the outer ends of mold-arms 124 and 125, as more clearly shown in Fig. 3. The opposite ends of the arms are secured adjacent to the upper ends of vertical shafts 126 and 127 rotatable in bearings 127' integral with the casing 114. The shafts 126 and 127 are provided with pinions 128 and 129, respectively, secured to the shafts and in mesh so that a rotation of one pinion with its shaft will cause an opposite movement of the other pinion, thus rocking the arms 121 and 122 to bring the molds into molding relation.

The molds are actuated by means comprising a lever member 131 having at one end a roller 132 in contact with a cam surface 133 secured to the hollow post 28. The other end of the lever member is pivoted to the lower end of shaft 126 and held under tension by helical spring 130, one end of which is secured to the shaft 126 and the other end of which is secured to the lever 131 which oscillates the shaft 126 to cause the molds to move together for a molding operation. By reason of the spring 130, however, the molds are held under a tensional force. The molds open under the action of a spring 134, the ends of which are connected to arms 135 and 136 extending from mold arms 124 and 125, respectively.

The foregoing is a detailed description of a selected embodiment of a machine for practicing the present invention. The several sealing steps or operations performed by the machine will be understood more clearly by reference to the diagrammatic views of Figs. 4 to 8, inclusive, taken with the other figures of the drawings showing the mechanism.

The conveyor travels in the direction indicated by the arrow X. A stem or mount is fed to a head at position A, and a bulb is fed to a head at position B. The stem and bulb are thus positioned as shown in Fig. 4. This is an important feature of the present invention since it is of great advantage to provide mechanism for performing a sealing-in operation without moving a bulb from one fire setting to another.

Heretofore, as above mentioned, when a sealing-in operation was performed the bulb and mount were first moved into, and retained for a time interval in a preheating zone which was employed to remove any strains or internal stress within the glass parts. The assembled parts were then moved to another heat zone for a fusing or sealing operation. Obviously this required a time period for preheating and a time period for the fusing operation and essentially slowed up the machine.

In accordance with the present invention, the preheating operation is eliminated since the present method makes it possible to seal-in and mold or shape the bulb neck in one position. This is accomplished, as above mentioned, by circulating air in the bulb during the fusing operation. It has been found that by providing a passage 109 for the delivery of air to the bulb, this flow of air, which first passes the initially heated wall of the bulb, is heated and acts to carry away or dissipate heat and has an annealing effect so that the fires 55' and 56' may be of relatively high temperature and directed in full force against the neck of the bulb, as shown in Fig. 4. By virtue of having the maximum radius of the receiver 89 smaller than the distance of the passage 109 from the axis of the shaft 91, the longitudinal discharge of air along the initially heated wall or neck of the bulb is not interfered with. These fires soften the glass which contracts and fuses with the flange 79 closing the bottom of the bulb, as shown in Fig. 5.

The air issuing from the passage 109 is then directed against the inner fused wall of the bulb neck below the flange and causes the wall to bulge, as shown in Fig. 6, and thin down until the lower end or cullet 141 is separated from the bulb, as shown in Fig. 7. The cullet when severed from the bulb drops onto a receiving platform or chute 141'. At this time the molds 121 and 122 are moved into close relation with the softened bulb neck. The fires 55' and 55" serve to keep the molds at an elevated temperature.

It will be noted that when the molds close about the bulb neck the lower end of the bulb is above the bottom of the mold. At this time the roller 99 is moved by the cam 102 to lower the shaft 91, and bring the upper end of the stem receiver or holder 89 flush with the lower inner surface of the mold, and the upper end of the holder 89 serves as a portion of the bottom surface of the mold. The air within the bulb then exerts sufficient pressure to press the softened glass against the bottom wall of the mold. The mold could be made so that the molten bulb neck would more completely fill the mold, but, owing to variations in the thickness of the flare tube, the molds are made so as to allow for this variation. Thus when the bulb neck has been blown into the mold, as shown in Fig. 8, the thickness of the wall may vary but the outside overall length will be controlled.

The operation of the cam 102, which causes a movement of the stem support, serves to carry the weight of the support and stem so that the air pressure applied to the softened glass wall need be only of a force sufficient to press the wall into intimate contact with the mold.

It has been found that good results may also be obtained by introducing air into the bulb for circulation by admitting the air or gas through the orifice 88', in which case the air flows through passage 96. The air thus delivered to the bulb flows around the wall and serves to transfer heat from the wall when the bulb is subjected to the hot sealing fires and to prevent cracking. When the air is delivered through the exhaust tube, it is necessary to terminate this flow of air just prior to the union between the bulb and flare tube, and to provide a current of air through passage 109 to sever the lower portion or cullet 141.

Heretofore in the molding of a bulb neck it has been the practice to carefully avoid any sharp corners; that is, all the corners were made of arcuate or rounded fillet form since it was believed that sharp bends or angular shoulders would subsequently cause cracks by reason of the strains set up in the glass. In lamp making, however, it is of great advantage to provide a sharply defined shoulder, especially in cases where it is necessary to have a close fit between a base and a bulb neck.

Ignoring prior teaching, the present invention provides a mold so formed that a bulb neck is shaped with a right-angle shoulder or abutment 142 and, by reason of the present method of sealing and shaping, the bulbs are found to be free from detrimental strains. Tests including the manufacture and storage of bulbs so made clearly show that bulbs produced in accordance with the present invention are free from cracks, and resist the rough handling attending shipment as well as the lamps made heretofore, if not to a greater extent.

As shown in the drawing, the molds employed are shaped with ledges 145 so formed that the resultant formation of the bulb includes an annular shoulder having a surface substantially transverse to the longitudinal axis of the bulb and substantially right angular in shape. Furthermore, the bulb neck is so formed as to provide a cylindrical plug or extension 146 with a relatively sharp edge 153. Between the cylindrical plug and adjacent to the abutment is formed a ring 147 which may be so proportioned as to snugly fit the inner surface of a base which is usually in the form of a metal shell. Thus, when a base is positioned to surround the bulb neck it is fitted to the surface of the ring 147 and pressed against the seat or abutment 145.

The hereinbefore mentioned advantages attributed to the special form of bulb neck have been directed to its use in connection with a base to be secured by mechanical means such as shown and described in my copending application Serial No. 55,520, filed Dec. 21, 1935, now Patent No. 2,119,681, dated June 7, 1938, and owned by the present assignee.

The abutment and sharp-corner formation is of great importance, however, in connection with the use of bases which are secured by a basing cement.

Fig. 11 shows a base applied to a bulb neck and, as shown, the upper edge 150 of a base 151 is disposed in contact with the abutment 142 and the inner surface of the base adjacent to the edge thereof fits the annular ring portion 147. With this construction the base, whether of plain tubular form or of threaded form, is frictionally fitted to the bulb neck and it has been found that when a basing cement 152 is employed the quantity of cement necessary is relatively small and that a fraction of the amount ordinarily used serves to hold the base. It has also been found by providing the abutment and annular seat and by proportioning the lower end 153 of the extension of such diameter as to contact with the inner surface of the threaded portion of the base, when a threaded base is used, that the base is held against lateral movement and the only duty of the cement is to prevent endwise movement of the base.

The structural arrangement of the bulb neck and base is such that very little strain is imposed on the cement and the base is prevented from rocking. As stated, a very thin layer of cement serves to hold the base against removal. This results in an economy of cement which is an important factor in connection with articles, such as incandescent electric lamps, produced in great quantities.

The present invention not only provides a new and improved sealing apparatus, but a new article of manufacture is produced in the form of a bulb neck adapted for use to hold a cemented base more firmly and constructed so as to cooperate with means for holding a base mechanically.

Although a preferred embodiment of the invention is shown and described herein, it is to be understood that modifications may be made without departing from the spirit and scope of the invention as set forth in the appended claims.

What is claimed:

1. A machine for sealing bulbs to stem-tubes comprising a holder for a stem-tube, means for supporting a bulb with the neck portion surrounding one end of the stem-tube, means for heating to seal said bulb neck to said stem-tube, and means for circulating a fluid in said bulb along the inner surface of said neck and on into the main portion of the bulb thereabove, before and during the sealing operation, said means comprising a hollow shaft supporting said holder and a sleeve surrounding said shaft and forming a passage therebetween opening longitudinally thereof, said holder having a maximum radius smaller than the distance of the passage from the shaft axis, so as not to interfere with the discharge of said fluid along said neck.

2. A machine for sealing bulbs to stem-tubes comprising a holder for a stem tube, means for supporting a bulb with the neck portion surrounding one end of the stem-tube, means for heating to seal said bulb neck to said stem-tube, and means for causing a fluid to pass over the heated surface of said bulb neck and circulate within the main portion of said bulb before and during the sealing operation, said means comprising a hollow shaft supporting said holder and a sleeve surrounding said shaft and forming a passage therebetween opening longitudinally thereof, said holder having a maximum radius smaller than the distance of the passage from the shaft axis, so as not to interfere with the discharge of said fluid along said neck.

3. A machine for sealing bulbs to stem-tubes, comprising a holder for supporting said bulb with one end of the stem-tube surrounded by the bulb neck, means for heating to seal said bulb neck to said stem-tube, and means for circulating a fluid within said bulb before and during the sealing operation, said means serving to cause said fluid to pass along the inner surface of the bulb neck and on into the main portion of the bulb during the sealing operation and after sealing to direct said fluid against the bulb neck below the sealed portion to sever the lower portion of said neck, said means comprising a hollow shaft supporting said holder and a sleeve surrounding said shaft and forming a passage therebetween opening longitudinally thereof, said holder having a maximum radius smaller than the distance of the passage from the shaft axis, so as not to interfere with the discharge of said fluid along said neck.

4. A machine for sealing bulbs to stem-tubes, comprising a holder for supporting said bulb with one end of the stem-tube surrounded by the bulb neck, means for heating to seal said bulb neck to said stem-tube, means for circulating a fluid between the stem-tube and bulb neck and within said bulb during the sealing operation, said means comprising a hollow shaft supporting said holder and a sleeve surrounding said shaft and forming a passage therebetween opening longitudinally thereof, said holder having a maximum radius smaller than the distance of the passage from the shaft axis, so as not to interfere with the discharge of said fluid along said neck, and means for shaping said seal to a predetermined form while still plastic.

5. A machine for sealing bulbs to stem-tubes, comprising a holder for supporting said bulb with one end of the stem-tube surrounded by the bulb neck, means for heating to seal said bulb neck to said stem-tube, means for circulating a fluid within said bulb during the sealing operation, said means comprising a hollow shaft supporting said holder and a sleeve surrounding said shaft and forming a passage therebetween opening longitudinally thereof, said holder having a maximum radius smaller than the distance of the passage from the shaft axis, so as not to interfere with the discharge of said fluid along said neck, said means serving to first direct said fluid between said tube and neck and on into the main portion of the bulb, and then against the bulb neck below the sealed portion to sever the lower portion of said neck, molding members, means for moving said members about the seal while still plastic, and means for forcing a fluid under pressure into said bulb to shape said bulb neck in said molding members.

6. A machine for sealing bulbs to stem-tubes comprising a conveyor, a plurality of rotatable holders on said conveyor, each holder having means for supporting a bulb with the neck portion surrounding one end of a stem-tube, a heat zone in the path of movement of said holders, means for moving said conveyor to cause said holders to travel continuously through said heat zone, the intensity of said zone being such that supported bulb necks and stem-tubes are united by fusion during the travel of said holders a given distance, and means for directing a fluid between each neck and stem tube so that it passes into the main portion of the bulb while being heated, said means comprising a hollow shaft supporting each holder and a sleeve surrounding said shaft and forming a passage therebetween opening longitudinally thereof, each holder having a maximum radius smaller than the distance of the passage from the shaft axis, so as not to interfere with the discharge of said fluid along each neck.

7. A machine for sealing bulbs to stem-tubes comprising a conveyor, means for holding stem-tubes, a plurality of holders on said conveyor, each holder having means for supporting a bulb over a stem-tube with its neck portion surrounding one end of said tube, a heat zone in the path of movement of said holders, means for moving said conveyor to cause said holders to travel continuously through said heat zone, the intensity of said zone being such that supported bulb necks and stem-tubes are united by fusion during the travel of said holders a given distance, and means for causing relative rotative movement between said holders and heat zone during travel through said zone, and means for directing cooling fluid into the main portions of the bulbs between said necks and stem tubes while being heated, said means comprising a hollow shaft supporting each holder and a sleeve surrounding said shaft and forming a passage therebetween opening longitudinally thereof, each holder having a maximum radius smaller than the distance of the passage from the shaft axis, so as not to interfere with the discharge of said fluid along each neck.

8. A machine for sealing bulbs to stem-tubes comprising a conveyor, a plurality of rotatable holders on said conveyor, each holder having means for supporting a bulb with the neck portion surrounding one end of a stem-tube, a heat zone in the path of movement of said holders, means for moving said conveyor to cause said holders to travel continuously through said heat zone, the intensity of said zone being such that supported bulb necks and stem-tubes are united by fusion during the travel of said holders a given distance, and means for circulating fluid between said necks and stem tubes and within the bulbs during the sealing operations, said means comprising a hollow shaft supporting each holder and a sleeve surrounding said shaft and forming a passage therebetween opening longitudinally thereof, each holder having a maximum radius smaller than the distance of the passage from the shaft axis, so as not to interfere with the discharge of said fluid along each neck.

9. A machine for sealing bulbs to stem-tubes comprising a conveyor, a plurality of rotatable holders on said conveyor, each holder having means for supporting a bulb with the neck portion surrounding one end of a stem-tube, a heat zone in the path of movement of said holders, means for moving said conveyor to cause said holders to travel continuously through said heat zone, the intensity of said zone being such that supported bulb necks and stem-tubes are united by fusion during the travel of said holders a given distance, means for rotating said holders during travel through said heat zone, and means for circulating fluid between said necks and stem tubes and within the bulbs during the sealing operations, said means comprising a hollow shaft supporting each holder and a sleeve surrounding said shaft and forming a passage therebetween opening longitudinally thereof, each holder having a maximum radius smaller than the distance of the passage from the shaft axis, so as not to interfere with the discharge of said fluid along each neck.

10. A machine for sealing bulbs to stem tubes comprising a holder for a stem-tube, means for supporting a bulb with its neck surrounding one end of said tube, means for heating the neck around said tube at full sealing intensity while cold, means for blowing gas between said neck and tube and on into the main portion of said bulb while heating, said means comprising a hollow shaft supporting said holder and a sleeve surrounding said shaft and forming a passage therebetween opening longitudinally thereof, said holder having a maximum radius smaller than the distance of the passage from the shaft axis, so as not to interfere with the discharge of said fluid along said neck, and means for terminating the flow of gas into the main portion of said bulb just prior to the union of the bulb and stem tube and admitting gas to the neck below said union to remove the cullet therefrom.

11. A machine for sealing bulbs to stem tubes comprising a holder for a stem-tube, means for supporting a bulb with its main portion above, and its neck surrounding one end of said tube, means for blowing air longitudinally upward between the stem tube and inner surface of the bulb neck, said means comprising a hollow shaft supporting said holder and a sleeve surrounding said shaft and forming a passage therebetween opening longitudinally thereof, said holder having a maximum radius smaller than the distance of the passage from the shaft axis, so as not to interfere with the discharge of said fluid along said neck, a manifold rotatable about said tube holder, an extension supporting said manifold, means for supplying combustible fluid to said extension, ports for conveying said fluid from said extension to said manifold, burners extending from said manifold so as to heat the neck around said tube, and means for rotating said manifold on said extension while the neck is being heated.

12. A machine for sealing bulbs to stem tubes comprising a holder for a stem-tube, means for supporting a bulb with its neck surrounding one end of said tube, means for blowing air longitudinally upward between the stem tube and inner surface of the bulb neck, said means comprising a hollow shaft supporting said holder and a sleeve surrounding said shaft and forming a passage therebetween opening longitudinally thereof, said holder having a maximum radius smaller than the distance of the passage from the shaft axis, so as not to interfere with the discharge of said fluid along said neck, means for heating the neck and sealing it to one end of said tube, arms swingable about normally vertical pivots and carrying molds, means for causing said molds to clamp over the seal portion of said neck, and means for supplying fluid pressure to said bulb to cause the seal portion to expand and fill said molds.

13. A machine for sealing bulbs to stem tubes comprising a tubular receiver for a stem tube, means for supporting a bulb with its neck portion surrounding one end of said stem tube, a hollow shaft in which the lower end portion of said tubular receiver is positioned, a sleeve in which said hollow shaft is movable, a gas conducting passage between said hollow shaft and sleeve and opening longitudinally thereof, said tubular receiver having a maximum radius smaller than the distance of the gas passage from the shaft axis, so as not to interfere with the longitudinal discharge of gas, means for slidably supporting said sleeve, means for heating to seal the bulb neck to said stem tube, and means for introducing gas into the passage between said hollow shaft and sleeve, so that it blows in the direction of the shaft axis along the inner surface of said neck and on into the main portion of the bulb thereabove, before and during the sealing operation.

14. A machine for sealing bulbs to stem tubes, comprising a tubular receiver for a stem tube, means for supporting a bulb with its neck portion surrounding one end of said stem tube, a hollow shaft in which the lower end portion of said stem tube is positioned, a sleeve in which said hollow shaft is movable, a gas conducting passage between said hollow shaft and sleeve and opening longitudinally thereof, said tubular receiver having a maximum radius smaller than the distance of the gas passage from the shaft axis, so as not to interfere with the longitudinal discharge of gas, means for slidably supporting said sleeve, means for heating to seal said bulb neck to said stem tube, means for introducing gas into the passage between said hollow shaft and sleeve, so that it first blows along the inner surface of said neck and on into the bulb thereabove, before and during the sealing operation, and then against the bulb neck below the sealed portion to sever the lower portion of said neck therefrom, molding members, means for moving said members to enclose said seal while still plastic, and means for finally forcing gas under pressure through said stem tube to expand and shape the bulb neck in said molding members.

MICHAEL E. McGOWAN.